BANDWIDTH REDUCTION SYSTEM FOR A MAGNETIC RECORDER

Filed July 3, 1967 2 Sheets-Sheet 1

INVENTOR
DONALD N. JAMES
BY Campbell, Harris & O'Rourke
ATTORNEYS

BANDWIDTH REDUCTION SYSTEM FOR A MAGNETIC RECORDER

Filed July 3, 1967 2 Sheets-Sheet 2

INVENTOR
DONALD N. JAMES
BY Campbell, Harris & O'Rourke
ATTORNEYS 3,492,441

BANDWIDTH REDUCTION SYSTEM FOR A MAGNETIC RECORDER

Donald N. James, Boulder, Colo., assignor to Ball Brothers Research Corporation, Boulder, Colo., a corporation of Colorado Filed July 3, 1967, Ser. No. 650,952
Int. Cl. G11b 5/02, 5/04
U.S. Cl. 179—100.2 7 Claims

ABSTRACT OF THE DISCLOSURE

A system and method is disclosed for FM (frequency modulation) recording which permits the use of a recording medium with a band pass which is less than the band of frequencies of the system carrier.

In operation, the system oscillator or carrier frequency is modulated in response to input data and then divided to provide two intermediate signals, each at one-half of the carrier frequency and each of the signals is recorded on separate tracks of a recorder.

During the playback mode, the two intermediate signals are properly summed through logical networks to reconstruct the oscillator frequency.

BACKGROUND OF THE INVENTION

Field of the invention

The latest patents known to applicant of the type relating to this invention have been classified under Patent Office classifications: Cl. 179—100.2; 340—174.1; 346—74 and 178—6.6.

Description of the prior art

Prior art patents known to applicant are as follows: 2,956,114, Ginsburg et al; 2,957,953, Woodward; 3,164,-815, Applequist; 3,188,615, Wilcox; 3,207,854, Johnson; 3,211,841, Uemura et al.; 3,217,329, Gabor; 3,287,505, Fukamachi.

In recording systems as represented by the known prior art, in order to obtain more data bandwidth, it is usually necessary to increase the bandpass of the recording medium to allow the use of a higher frequency.

SUMMARY OF THE INVENTION

This invention relates to a system and technique for permitting recording of a broader bandwidth than has heretofore been attainable on a recording medium without increasing the bandpass of the recording medium. In the system of the invention, the system oscillator frequency is divided to provide two intermediate signals, each at one-half of the oscillator frequency and shifted in phase relationship. The two intermediate signals are thence recorded on separate tracks on a recorder.

During the playback mode the two signals recorded on the separate tracks on the recorder are then combined through logical circuitry to reconstruct the original oscillator frequency which is then fed through a discriminator to the output circuitry.

It has been found that the system and method of the invention enable a wider bandwidth to be recorded without increasing the bandwidth of the recording medium. In addition, the signal-to-noise ratio is markedly improved when the wider bandwidth is not utilized.

DESCRIPTION OF THE PREFERRED EMBODIMENTS

Figures 1, 6:
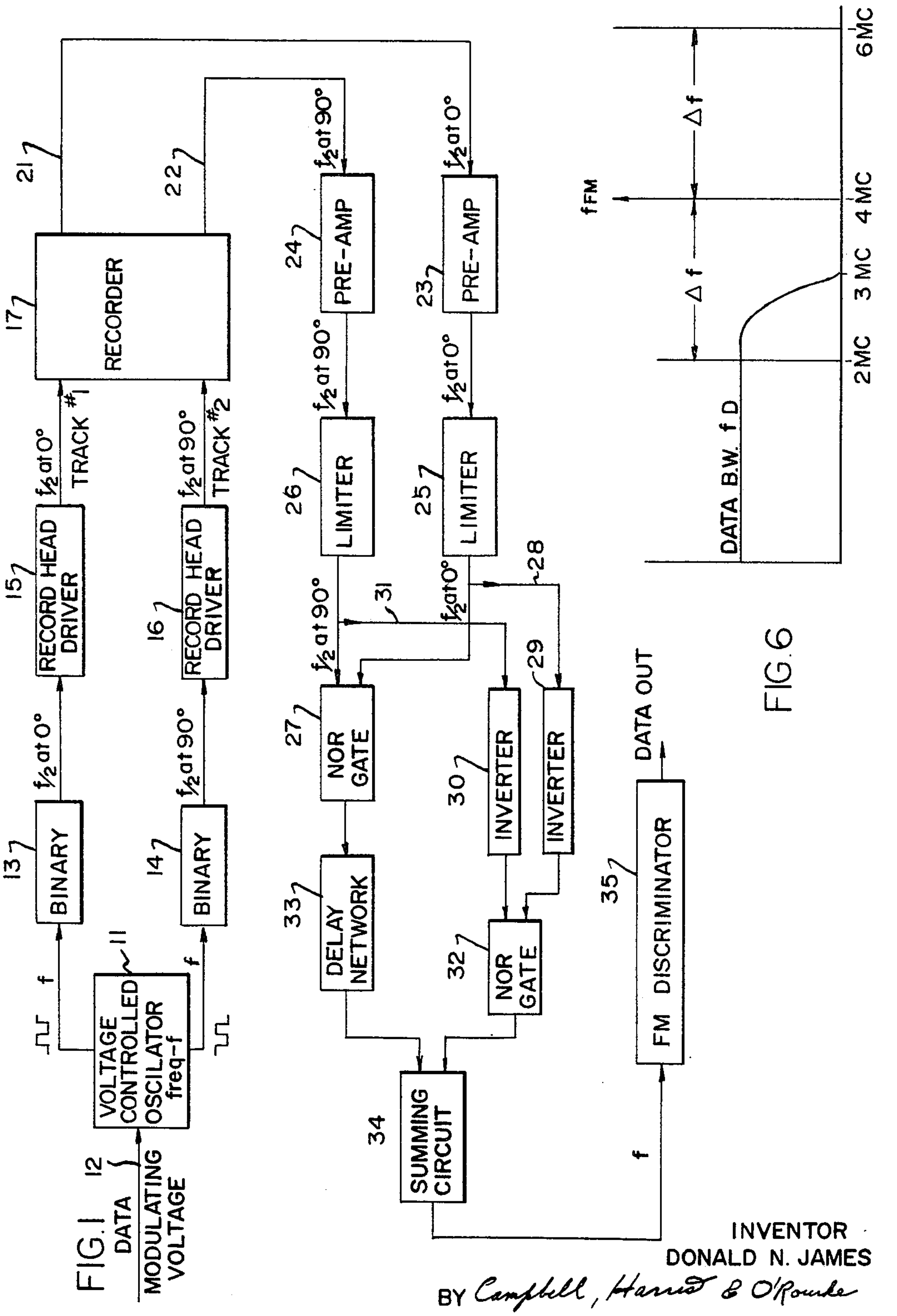
FIG. 1 is a block diagram of one embodiment of the invention also illustrating the flow path of the signals at various points in the system.
FIG. 6 is a sketch useful in explaining the improvement in signal-to-noise ratio provided by the system of the invention.

A preferred embodiment of the system of the invention is illustrated in FIG. 1.

It should be understood at the outset that in the system embodiment of FIG. 1 certain frequencies are utilized, and that for clarity in explanation the following description refers to these particular frequencies; however, the system and method of the invention are of broad application and are not limited to the particular frequencies referred to. Thus, before entering into a description of the circuitry of FIG. 1 and to obtain a numerical basis for understanding the concept of the invention; note, for example, that in the prior art if a recording medium with an upper cutoff frequency in the neighborhood of 6.5 mc. is used to record data by means of an FM carrier, the FM carrier frequency is deviated from 4 to 6.5 mc., and the maximum practical data bandwidth is approximately 4 mc. In order to obtain more data bandwidth by prior art methods, it is necessary to increase the bandpass of the recording medium to allow the use of a higher carrier frequency.

In contrast to the foregoing, and as mentioned above, the present invention allows a frequency of twice the original data bandwidth to be recorded without increasing the bandwidth of the recording medium. For example, if an 8 mc. data bandwidth is desired, it can be accomplished using a recording system with a 6.5 mc. cutoff and recording an FM carrier with a voltage-controlled oscillator being deviated from 8 mc. to 13 mc. The output of this oscillator drives two binary stages which can be arranged to operate in time-phased relation of 90°. Accordingly, two 4 mc. to 6.5 mc. wavetrains phased at 90° are provided.

The binary outputs are then each recorded on separate tracks of the recorder, each of which tracks has a 6.5 mc. cutoff. During the playback mode the two 4 to 6.5 mc. tracks are recombined and summed through logical circuitry to reconstruct the original 8 mc. to 13 mc. waveform. Thus, an effective bandwidth of twice the bandpass of the recording medium can be recorded.

Referring now to FIG. 1, the system of the invention includes a voltage-controlled oscillator 11 of any suitable known type which operates at a relatively high carrier frequency. The voltage-controlled oscillator 11 is modulated by the data input to the system, as is well-known in the art, and indicated by the arrowed line 12 connected to the oscillator 11. The output from the oscillator 11 is arranged to be a two-phase output, one output, say, the in-phase or 0° phase output is coupled to a binary circuit 13, and the 180° phase output is coupled to a binary circuit 14, both of which binary circuits may be of any suitable known type. As is well-known, the binary circuits 13 and 14 function to divide the input frequency coupled thereto by two and, hence, provide signal outputs at one-half of the input signal frequency. The binary circuit 13 is arranged to be triggered on the positive-going edges of the oscillator 11 waveforms to provide an output in phase with the oscillator input, see FIG. 3. The output of binary circuit 13 is coupled to a recording head driver 15 which drives the associated recording head (not shown) to record data signals on one track, Track No. 1 of recorder 17.

The recorder 17 and the associated recording heads (not shown) may be of any suitable known type, but is preferably a disc-type recorder. It has been found that while tape recorders might be utilized, generally such tape recorders have a detrimental track-to-track time jitter caused by skew of the tape past the recording heads. Accordingly, disc recorders or other hard medium recorders are preferable since they reduce the problem of time jitter between the recording tracks.

Figure 3:
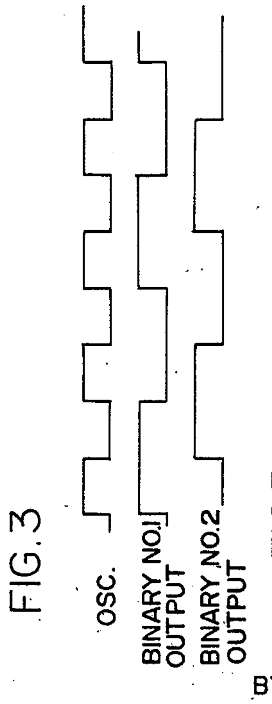

The binary circuit 14 is arranged to be triggered by the positive-going edges of the oscillator 11 waveforms to provide an output phase-shifted 90° with respect to the output from binary circuit 13, see FIG. 3. Thus, a 90° phase shift can be obtained with the output of binary unit 14 leading or lagging the output from binary unit 13 by 90°. The output from the binary circuit 14 is coupled to the recording head driver 16 which then drives the associated head to record on a second track, Track No. 2 of the recorder 17.

During the playback mode, the output from the recorder 17 is coupled through associated conventional reading heads (not shown) and leads 21 and 22 to respective preamplifier circuits 23 and 24 which amplify the outputs from the recorder 17.

Note, that the preamplifier circuits 23 and 24, as well as all of the various blocks shown in FIG. 1, comprise circuits well-known in the art and are available commercially; and, also that the specific circuitry in each block does not form a part of this invention and hence will not be described in detail.

The recorded signals on Track No. 1 of recorder 17 are coupled through the preamplifier 23 and a conventional limiter circuit 25 to a Nor-logic gate 27. Likewise, the recorder signals on Track No. 2 of recorder 17 are coupled through preamplifier 24 and a conventional limiter circuit 26 to the Nor-logic gate 27.

The outputs from each of limiters 25 and 26 are also coupled through to respective conventional inverters 29 and 30 to a second Nor-logic gate 32. The output from Nor gate 27 is coupled through a delay network 33 to a summing circuit 34. Likewise, the output of Nor gate 32 is coupled to summing circuit 34 where the two signals are actually summed or combined to form the voltage-controlled oscillator frequency $f$, as will be explained further hereinbelow in connection with FIG. 4. The output from the summing circuit 34 is then fed through a conventional FM discriminator 35 to provide the data output.

Figure 4:
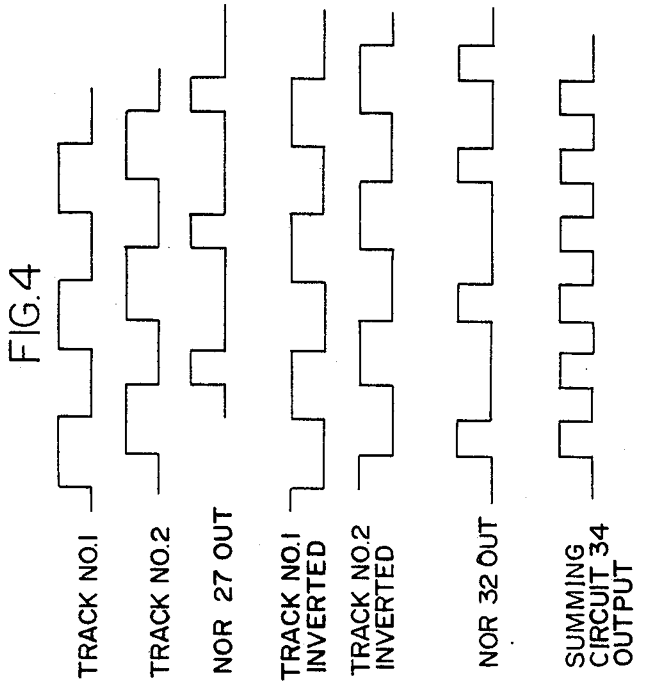
FIGS. 3 and 4 show waveforms useful in explaining the operation of the system of FIG. 1.

The operation of the reconstructing or combining circuit utilized to combine the two 4 mc. to 6.5 mc. output wavetrains from Track No. 1 and Track No. 2 into an output frequency at 8 mc. to 13 mc. can be readily understood by reference to FIG. 4. Referring to FIG. 4, the signal from recording Track No. 1 coupled through preamplifier 23 and limiter 25 to Nor gate 27 is shown in the waveform train labeled "Track No. 1" in FIG. 4; and, the signal from Track No. 2 coupled through preamplifier 24 and limiter 26 to Nor gate 27 is shown in the waveform train labeled "Track No. 2." As is known, the Nor gate 27 provides a positive output through the delay network 33 to the summing circuit 34 when neither the signal from Track No. 1 nor Track No. 2 are positive; i.e., when both signals are negative.

The signals from Track No. 1 and Track No. 2 are also coupled in parallel from the limiters 25 and 26 through leads 28 and 31 to the inverters 29 and 30, respectively, whence the signals are inverted before being coupled to the second Nor gate 32. As shown in the waveform train labeled "Nor 32 Out" of FIG. 4, the Nor gate 32 provides a positive-going pulse output whenever neither of the signals received from inverters 29 and 30 are positive; i.e., both signals are negative. Note that the output from the Nor circuit 27 and the Nor circuit 32 are, in effect, interleaved.

The delay network 33 provides a delay equal the propagation delay of the inverters 29 and 30 in order to maintain the phase relationship of the signals as shown in FIG. 4. In systems operating at lower frequencies, the delay network 33 may not be necessary.

The summing circuit 34 receives the outputs from each of the Nor gates 27 and 32 and, as is known in the art, combines or sums the signals to provide a summed output. The output signal from summing circuit 34 is thus the reconstructed initial carrier signal frequency as shown in the waveform labeled "Summing Circuit 34 Output" in FIG. 4. The signal from the summing circuit 34 is coupled to an FM discriminator 35 which functions, as is known in the art, to discriminate or remove the initial carrier frequency and provide a data output representative of the data modulating input voltage.

Figure 2:
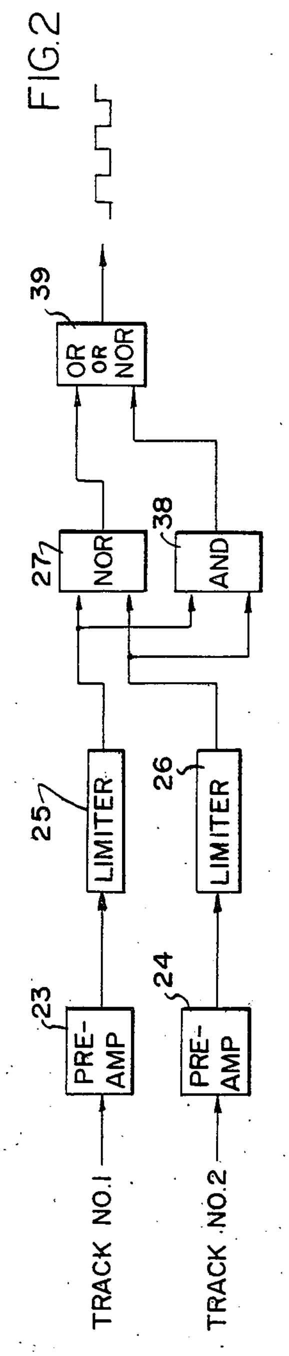
FIG. 2 is another embodiment of the invention showing a modification of the portion of the system of FIG. 1 for recombining or reconstructing the original signal received from the recording tracks on the recording medium.

Another embodiment of the invention, or more particularly a modified circuit, for reconstructing the output from the recorder 17 to provide the initial carrier signal frequency is shown in FIG. 2. In FIG. 2, the output from Track No. 1 is coupled through the preamplifier 23 and limiter 25 to Nor circuit 27, and in parallel to a conventional And-logic circuit 38. Likewise, the output from Track No. 2 is coupled through preamplifier 24 and limiter 26 to the Nor circuit 27, and in parallel to And circuit 38.

Figure 5:
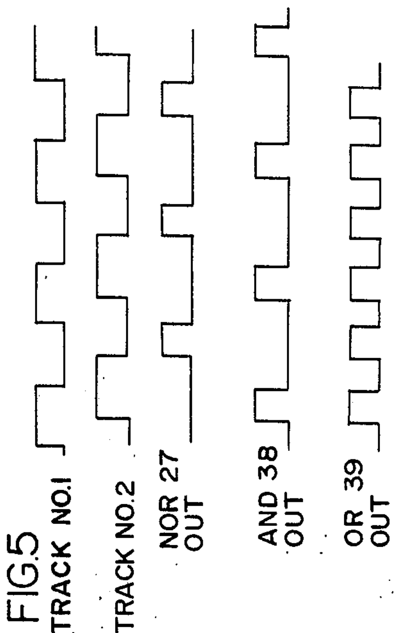
FIG. 5 shows waveforms useful in explianing the operation of the system of FIG. 2.

The waveforms explaining the operation of FIG. 2 are shown in FIG. 5. The Nor circuit 27 provides a positive-going output pulse when neither of the pulsed signals from Track No. 1 nor Track No. 2 are positive. The And circuit, on the other hand, provides an output only when both of the pulsed signals from Track No. 1 and from Track No. 2 are positive-going signals. The signals from the Nor circuit 27 and the And circuit 38, which are effectively interleaved, are coupled to an Or or Nor circuit 39 which, as is known, provides an output which is the sum of the outputs from Nor circuit 27 and And circuit 38.

In addition to enabling the recording of an effective bandwidth which is broader than the bandpass of the recording medium, the invention provides an improvement in the signal-to-noise ratio of the system when the increased bandwidth capability is not utilized. The following specific example and the sketch of FIG. 6 will be employed to explain the improvement in the signal-to-noise ratio which is provided by the system of the invention.

Assume that an FM recording system has the following parameters and refer to FIG. 5:

$S/N_C$—The signal-to-noise ratio of the FM carrier and is 20 db or 10:1
$f_{FM}$—FM carrier frequency 4 mc.
$S/N_{FM}$—The signal-to-noise ratio of the output signal
$\Delta f$—Carrier deviation is $\pm 2$ mc., therefore $\Delta f$ is 2 mc.
$f_D$—Data frequency is 3 mc.
MI—Modulation index is $\Delta f/f_D = 2/3$ The data frequency signal-to-noise ratio, the modulation index and the carrier signal to noise ratio are related according to the following formula:

$$S/N_{FM} = 3.S/N_c.(MI)^2$$

Using the sample-assumed values in a standard FM recording system and substituting the numerical values in the preceding formula, the following result is obtained:

$$S/N_{FM} = (3).(10).(2/3)^2 = 13.3 \text{ or } 22.5 \text{ db}$$

If a two-track method of recording is used, each track can be deviated the same amount ($4\pm 2$ mc.); therefore, an 8 mc. voltage-controlled oscillator would be used. The 8 mc. oscillator is deviated $\pm 4$ mc. and the two binary stages provide two outputs to be recorded, each of which is $4\pm 2$ mc. The data bandwidth of 3 mc. is the same as before; however, only half of this bandwidth is recorded on each track. The binary stages provide this division automatically since each one is responsive or triggered at only every other edge of the oscillator waveform. The bandwidth per track is then 3 mc./2 or 1.5 mc. The $S/N_c$ (signal-to-noise ratio of FM carrier) is still the same at 10:1, but the MI (modulation index) is now 2/1.5 mc. or 1.33 instead of the 2/3 mc. or 0.667 of the one-track system. This MI factor is squared when computing the $S/N_{FM}$, for a two-track recording system the $S/N_{FM}$ is given by agains substituting in the preceding formula as follows:

$$S/N_{FM}=(3).(10).(1.33)^2=53 \text{ or } 34.5 \text{ db}$$

As can be seen a 12 db increase (34.5 db–22.5 db) in $S/N_{FM}$ is obtained by using the two-track recording system of the invention.

While the invention has been particularly shown and described with reference to preferred embodiments thereof, it will be understood by those skilled in the art that various changes in form and details may be made therein without departing from the spirit and scope of the invention.

I claim:

1. A system for recording modulatable carrier signals on a recording medium having a bandpass less than the system carrier frequency comprising, in combination:
- means for generating a carrier signal at a selected system frequency;
- means for receiving said carrier signal and providing two separated signals the time-phased relation between which is dependent upon the timewise spacing between oppositely changing portions of the system carrier signal, each signal at a frequency less than the system frequency;
- means for recording each of said separate signals on individual tracks of the associated recording medium;
- means for playing back the recorded signals;
- system logical circuitry including at least two parallel connected logic gates;
- means for coupling said recorded signals to said parallel connected logic gates to recombine said recorded signals and reconstruct the carrier signal at said selected system frequency.

2. A system as in claim 1 wherein:
- said recording medium is a disc recorder having separate recording heads recording on respective tracks; and
- wherein said recording heads receive the respective separate signals from said binary means.

3. A system as in claim 1 wherein said system logical circuit comprises:
- three logical gates;
- means for coupling the said first and second track-recorded signals to the first and second gates in parallel; and
- means for coupling the outputs from said first and second gates to said third gate to combine said recorded signals to provide said carrier signal at the system frequency.

4. The system of claim 1 wherein said system logical circuitry comprises:
- first means for receiving the recorded signal from one track;
- second means for receiving the recorded signal from a second track;
- first and second Nor gates;
- means for coupling said first and second track-recorded signals to said first Nor gate;
- inverter means;
- means for coupling said first and second track-recorded signals through respective inverter means to said second Nor gate; and
- a summing network for receiving the output from said first and second Nor gates whereby said first and second track-recorded signals are combined to reconstruct said carrier signal at the system frequency.

5. A system as in claim 4 further including delay means connected to receive the signal in the path of said first Nor gate to compensate for propagation delays through said inverter means whereby the signal relationships are maintained constant.

6. A system for recording frequency modulated (FM) signals on a recording medium having a bandpass less than the system carrier frequency comprising, in combination:
- a voltage-controlled oscillator for generating a carrier signal at a selected system frequency;
- means for modulating said carrier frequency signal in response to input data; and
- a pair of binary circuits for receiving said carrier signal and providing two separated signals shifted 90° in time-phased relation with respect to each other, each signal at a frequency one-half of the system frequency;
- recorder means for recording each of said separate signals on individual tracks;
- means for playing back the recorded signals;
- system logical circuitry including a plurality of logic gates;
- means for coupling said recorded signals through said logic gates of said logical circuitry to recombine said recorded signals and reconstruct said carrier signal at said selected system frequency; and
- an FM discriminator for removing said carrier signal at said system frequency after said recorded signals have been recombined to reconstruct said carrier signal whereby the output from said system is representative of said input data.

7. A system for transposing a modulatable carrier frequency signal into two separated signals each having a frequency less than the system carrier frequency, the system comprising:
- means for generating first and second modulatable carrier frequency signals having a substantially 180° phase-relation with respect to one another;
- means including first and second binary means each of which receives a different one of said first and second modulatable carrier frequency signals, said binary means being triggered in time-spaced relation to provide two separate signals each at one-half of the carrier signal frequency and shifted 90° relative to each other;
- means for sending said two separate signals through a medium having a signal bandpass less than the said system carrier frequency;
- means for receiving said separate signals; and means including at least two parallel connected logic gates connected to receive said separate signals from said last named means to recombine said separate signals and thereby reconstruct the modulatable carrier frequency signal after passage through said medium.

References Cited

UNITED STATES PATENTS

| | | | |
|---|---|---|---|
| 2,944,107 | 7/1960 | Johnson | 178—6.6 |
| 2,944,113 | 7/1960 | Wehde et al. | 179—15.55 |
| 3,262,104 | 7/1966 | Clynes | 340—174.1 |

BERNARD KONICK, Primary Examiner

JEROME P. MULLINS, Assistant Examiner

U.S. Cl. X.R.

178—6.6